United States Patent
Tan et al.

(10) Patent No.: US 12,295,047 B2
(45) Date of Patent: May 6, 2025

(54) INFORMATION PROCESSING METHOD AND APPARATUS, DEVICE AND STORAGE MEDIUM

(71) Applicant: ZTE Corporation, Guangdong (CN)

(72) Inventors: Jie Tan, Guangdong (CN); Xiubin Sha, Guangdong (CN); Bo Dai, Guangdong (CN); Jianxun Ai, Guangdong (CN)

(73) Assignee: ZTE Corporation, Shenzhen (CN)

( * ) Notice: Subject to any disclaimer, the term of this patent is extended or adjusted under 35 U.S.C. 154(b) by 342 days.

(21) Appl. No.: 17/870,610

(22) Filed: Jul. 21, 2022

(65) Prior Publication Data

US 2023/0038753 A1 Feb. 9, 2023

Related U.S. Application Data

(63) Continuation of application No. PCT/CN2020/137207, filed on Dec. 17, 2020.

(30) Foreign Application Priority Data

Jan. 21, 2020 (CN) .......................... 202010071985.2

(51) Int. Cl.
*H04W 74/08* (2024.01)
*H04W 8/22* (2009.01)
*H04W 74/0833* (2024.01)

(52) U.S. Cl.
CPC ......... *H04W 74/0841* (2013.01); *H04W 8/22* (2013.01)

(58) Field of Classification Search
CPC ..... H04W 74/0841; H04W 8/22; H04W 8/24; H04W 36/0033; H04W 74/0833; H04W 36/0055; H04W 72/0453; H04W 72/21; H04W 74/002; H04W 76/19; H04W 76/27; H04L 5/0016; H04L 1/1671; H04L 5/001; H04L 5/0023; H04L 5/0053; H04L 5/0055; H04L 5/0094; H04L 1/1607
See application file for complete search history.

(56) References Cited

U.S. PATENT DOCUMENTS

| | | | |
|---|---|---|---|
| 9,648,445 | B2 | 5/2017 | Jang et al. |
| 10,506,478 | B2 | 12/2019 | Martin |
| 10,609,733 | B2 | 3/2020 | Awad |
| 11,212,667 | B2 | 12/2021 | Kim et al. |

(Continued)

FOREIGN PATENT DOCUMENTS

| | | |
|---|---|---|
| CN | 107431962 A | 12/2017 |
| CN | 110431864 A | 11/2019 |

(Continued)

OTHER PUBLICATIONS

European Search Report issued in EP Patent Application No. 20915408.7, dated on Dec. 12, 2023, 8 pages.

(Continued)

*Primary Examiner* — Steven Hieu D Nguyen
(74) *Attorney, Agent, or Firm* — Perkins Coie LLP

(57) ABSTRACT

Provided is an information processing method and apparatus, a device and a storage medium. The information processing method includes: radio capability information is sent to a next generation NodeB (gNB); where the radio capability information includes user equipment (UE) capability information.

8 Claims, 7 Drawing Sheets

(56) References Cited

U.S. PATENT DOCUMENTS

| | | | |
|---|---|---|---|
| 2016/0316358 A1 | 10/2016 | Orr et al. | |
| 2017/0280484 A1* | 9/2017 | Awad | H04W 88/187 |
| 2018/0132282 A1 | 5/2018 | Ly et al. | |
| 2019/0141695 A1 | 5/2019 | Babaei et al. | |
| 2019/0363843 A1 | 11/2019 | Gordaychik | |
| 2019/0373450 A1 | 12/2019 | Zhou et al. | |
| 2021/0195654 A1* | 6/2021 | Lei | H04B 17/327 |
| 2021/0227451 A1* | 7/2021 | Babaei | H04W 76/27 |
| 2022/0095415 A1* | 3/2022 | Liu | H04W 80/02 |
| 2022/0279595 A1* | 9/2022 | Jang | H04W 48/18 |
| 2022/0418000 A1* | 12/2022 | Zhang | H04W 74/0833 |

FOREIGN PATENT DOCUMENTS

| | | |
|---|---|---|
| CN | 111901835 A | 11/2020 |
| JP | 2017-508406 A | 3/2017 |
| JP | 2017-529800 A | 10/2017 |

OTHER PUBLICATIONS

International Preliminary Report on Patentability issued in International Patent Application No. PCT/CN2020/137207, dated Jul. 26, 2022, 5 pages.

International Search Report and Written Opinion International Application No. PCT/CN2020/137207, mailed on Mar. 18, 2021 (9 pages).

Moderator (Intel Corporation), "Moderator summary #3 on RedCap—Others", 3GPP TSG RAN WG1 Meeting #103-E, R1-200xxxx, e-Meeting, 29 pages, Oct. 26-Nov. 13, 2020.

Japanese office action issued in JP Patent Application No. 2022-544329, dated Jul. 1, 2024, 7 pages. English translation included.

Japanese Notice of Allowance issued in JP Patent Application No. 2022-544329, dated Oct. 3, 2024, 3 pages. English machine translation included.

European Communication under Rule 71(3) EPC issued in EP Patent Application No. 20915408.7, dated Feb. 6, 2025, 58 pages.

* cited by examiner

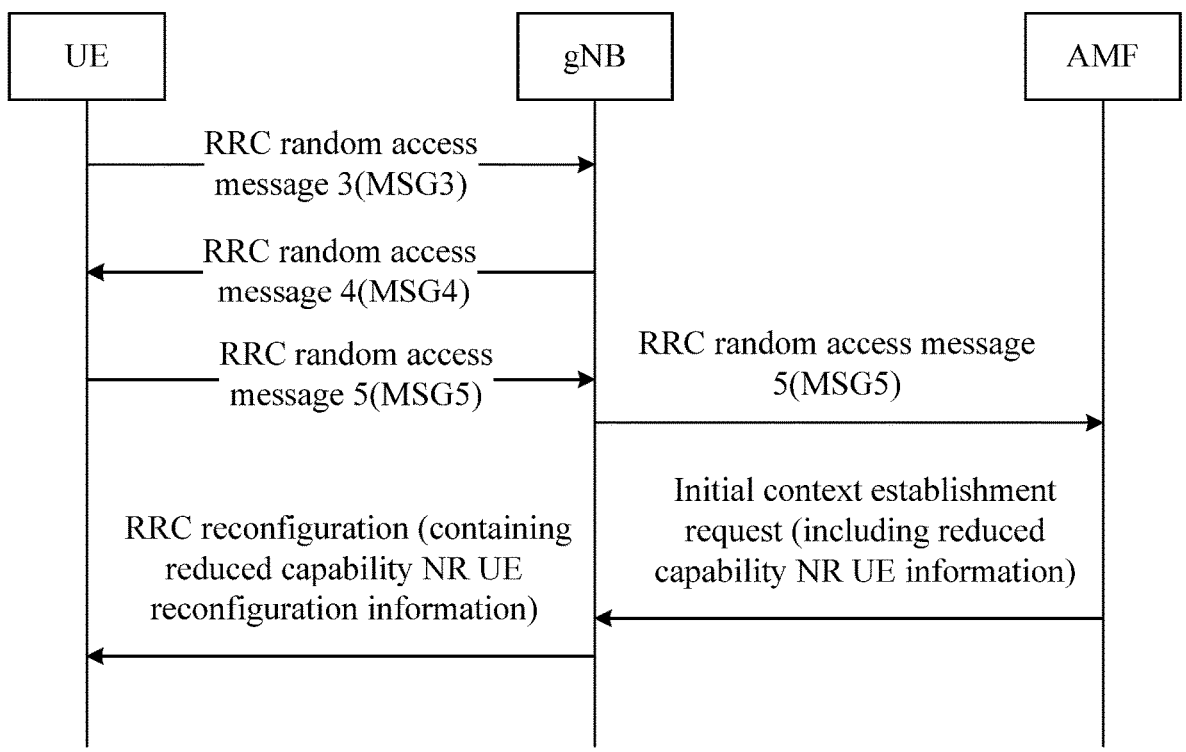

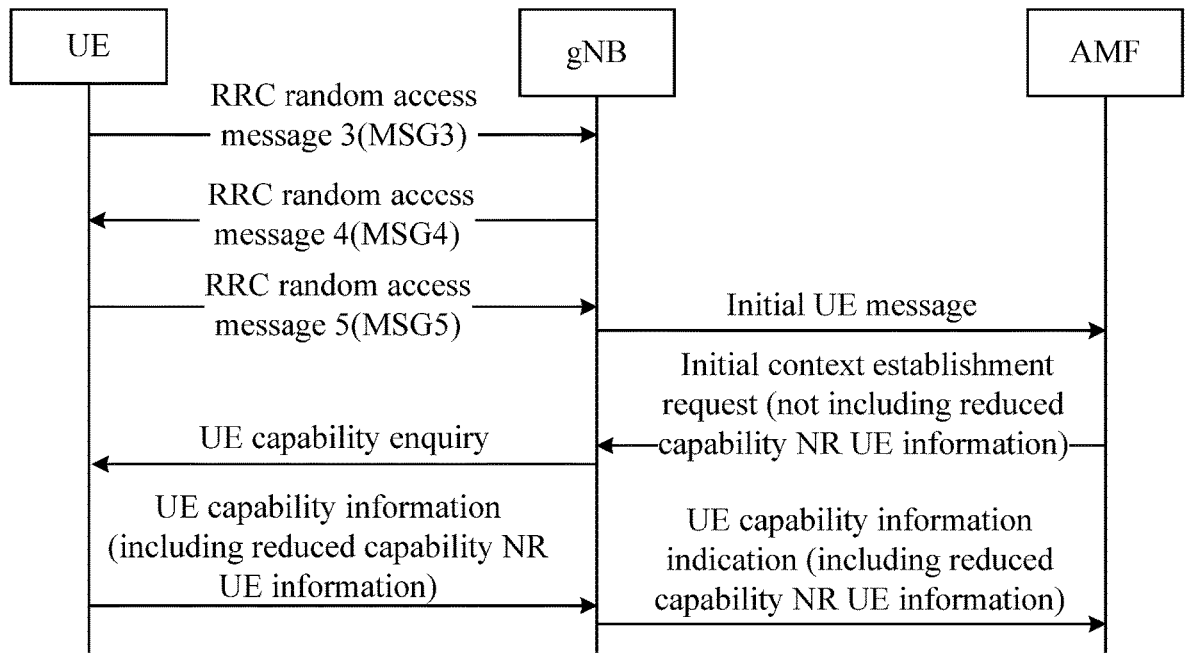
FIG. 4
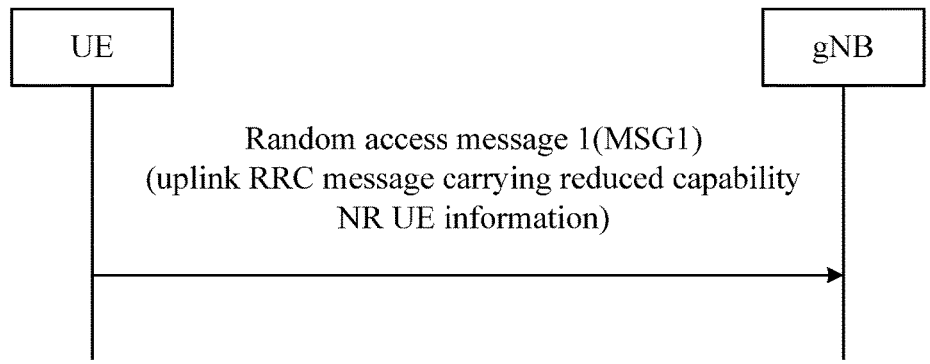
FIG. 5
FIG. 6

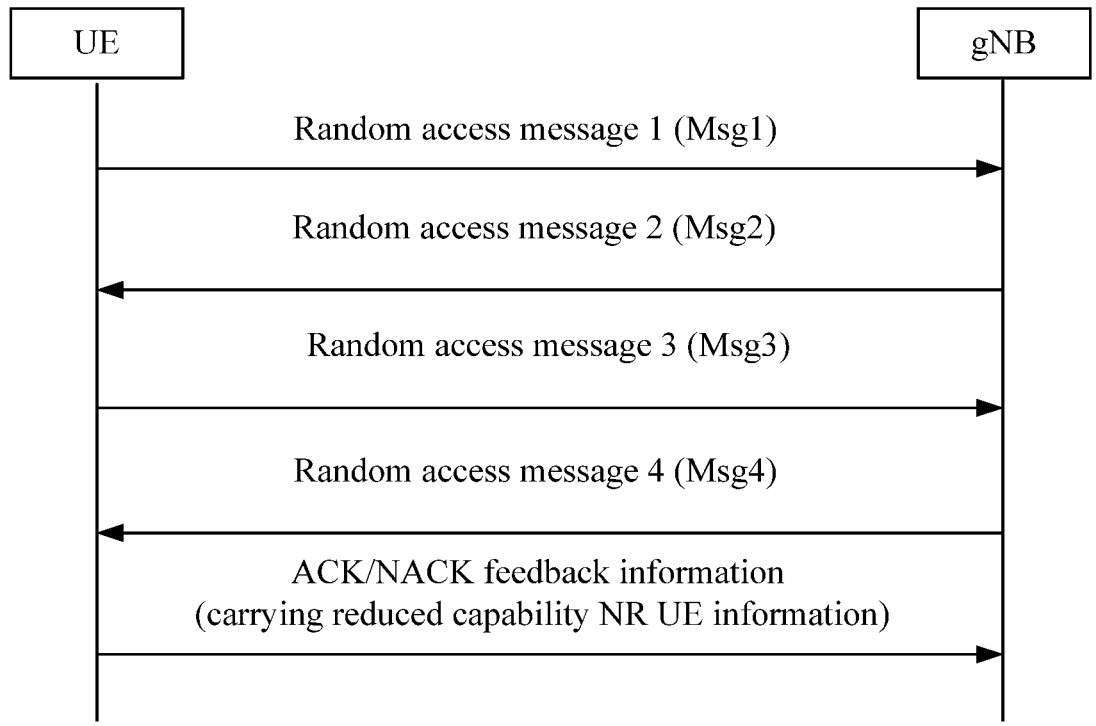
FIG. 10
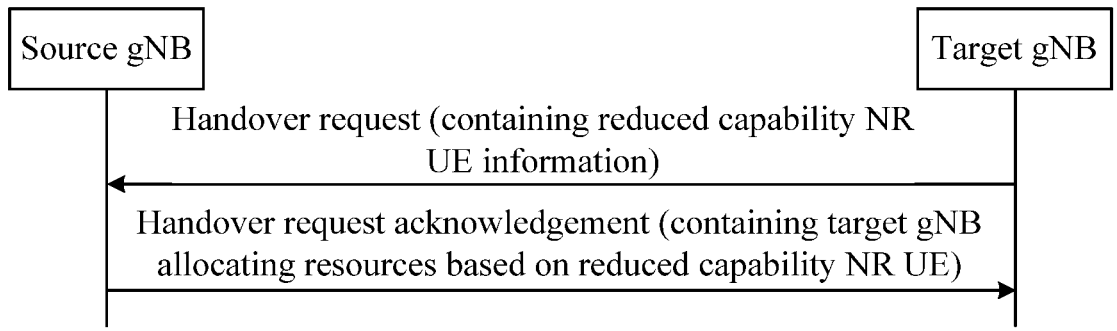
FIG. 11
FIG. 12

INFORMATION PROCESSING METHOD AND APPARATUS, DEVICE AND STORAGE MEDIUM

CROSS-REFERENCE TO RELATED APPLICATIONS

This application is a continuation of International Patent Application No. PCT/CN2020/137207, filed on Dec. 17, 2020, which claims priority to Chinese Patent Application No. 202010071985.2, filed with the China National Intellectual Property Administration (CNIPA) on Jan. 21, 2020, the contents of each of which are incorporated herein by reference in their entirety.

TECHNICAL FIELD

The present application relates to wireless communication networks and, for example, to an information processing method and apparatus, a device, and a storage medium.

BACKGROUND

In the new radio (NR) access standard, the radio capability information of the NR user equipment (UE) needs to be provided to a next generation NodeB (gNB), and the gNB can make a correct scheduling for the UE after the gNB gets the UE capability. When the radio capability information of the UE includes a certain supported function, the gNB may configure a resource related to the function for the UE according to the radio capability information; if a certain function that the UE may support is not included in the radio capability information of the UE, then the gNB cannot configure the function for the UE. When conditions of UE attachment, tracking area update (TAU), capability change and the like are considered at the same time, the gNB forwards the radio capability information of the UE to the access and mobility management function (AMF), and the AMF stores the radio capability information of the UE to be used by subsequent services. After the NR protocol introduces reduced capability NR UEs (reduced capability NR devices), whether a network side is an allocation of a resource during service establishment, reconfiguration or handover, or a scheduling in a service maintaining process, if resources related to the reduced capability NR UE need to be allocated, the gNB needs to know what function the reduced capability NR UE may support, and under a related standard state, the gNB cannot acquire the capability supported by the reduced capability NR UE.

SUMMARY

The present application provides an information processing method and apparatus, a system, and a storage medium.

An embodiment of the present application provides an information processing method, the method is applied to a UE, and the method includes that radio capability information is sent to a gNB; where the radio capability information includes UE capability information.

An embodiment of the present application provides an information processing method, the method is applied to a gNB, and the method includes that radio capability information of a user equipment (UE) is received; where the radio capability information includes UE capability information.

An embodiment of the present application provides an information processing method, the method is applied to an AMF, and the method includes that radio capability information of a user equipment (UE) is sent to a gNB; where the radio capability information includes UE capability information.

An embodiment of the present application provides an information processing apparatus, the apparatus is applied to a UE, and the information processing apparatus includes a sending module. The sending module is configured to send radio capability information to a next generation NodeB (gNB); where the radio capability information includes UE capability information.

An embodiment of the present application provides an information processing apparatus, the apparatus is applied to a gNB, and the information processing apparatus includes a receiving module. The receiving module is configured to receive radio capability information of a user equipment (UE); where the radio capability information includes UE capability information.

An embodiment of the present application provides an information processing apparatus, the apparatus is applied to an AMF, and the information processing apparatus includes a forwarding module. The forward module is configured to send radio capability information of a user equipment (UE) to a gNB; where the radio capability information includes UE capability information.

An embodiment of the present application provides a device, the device includes one or more processors and a memory. The memory is configured to store one or more programs, where the one or more programs, when executed by the one or more processors, cause the one or more processors to implement the information processing method described in any one of the embodiments of the present disclosure.

An embodiment of the present application provides a computer readable storage medium, having stored thereon a computer program, where the computer program, when executed by a processor, implements the information processing method described in any one of the embodiments of the present disclosure.

According to the technical scheme provided in the embodiments of the present application, the radio capability information containing the UE capability information is sent to the gNB, so that the capability supported by the UE is acquired by the gNB, related resources are distributed for the UE, a corresponding function of the UE is realized, the usability of a UE service is guaranteed, and the user experience degree is improved.

BRIEF DESCRIPTION OF DRAWINGS

FIG. 1 is a flowchart of an information processing method provided in an embodiment of the present application;

FIG. 2 is a flowchart of another information processing method provided in an embodiment of the present application;

FIG. 3 is an example diagram of an information processing method provided in an embodiment of the present application;

FIG. 4 is an example diagram of an information processing method provided in an embodiment of the present application;

FIG. 5 is a flowchart of another information processing method provided in an embodiment of the present application;

FIG. 6 is an example diagram of an information processing method provided in an embodiment of the present application;

FIG. 10 is an example diagram of an information processing method provided in an embodiment of the present application;

FIG. 11 is a flowchart of an information processing method provided in an embodiment of the present application;

FIG. 12 is an example diagram of an information processing method provided in an embodiment of the present application;

DETAILED DESCRIPTION

Figure 7:
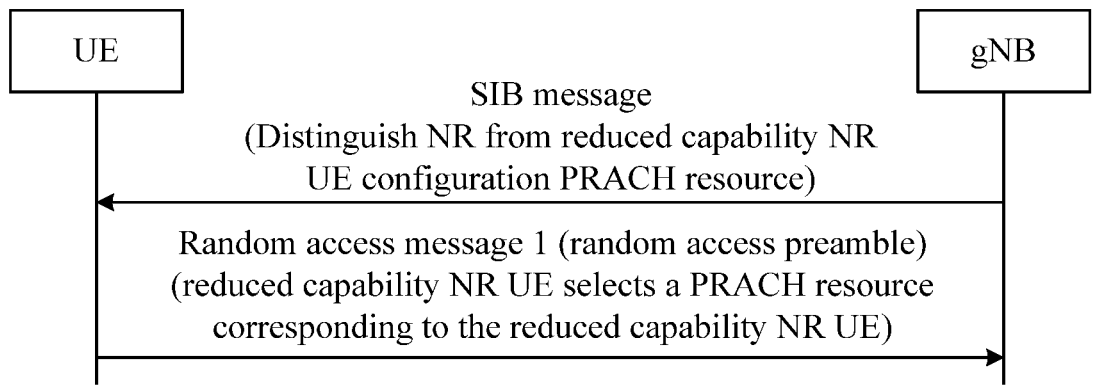
FIG. 7 is an example diagram of an information processing method provided in an embodiment of the present application.

Embodiments of the present application will be described in detail with reference to the accompanying drawings hereinafter. It should be noted that the embodiments and features in the embodiments of the present application may be arbitrarily combined with each other without conflict.

FIG. 1 is a flowchart of an information processing method provided in an embodiment of the present application, the embodiment of the present application is applicable to a case of uploading reduced capability NR UE information of a UE, and this method may be executed by an information processing apparatus in the embodiment of the present application, where the apparatus may be implemented by software and/or hardware and generally integrated in the UE, and the method of the embodiment of the present application specifically includes the following.

In 101, radio capability information is sent to a next generation NodeB (gNB); where the radio capability information includes UE capability information.

The radio capability information may be radio capability information of the user equipment (UE), and may include information such as a number of antennas, a bandwidth, an operating condition, and a processing delay. The gNB may be a 5G gNB, and may configure a resource to support functions of the UE according to the radio capability information sent by the UE.

The UE may send its own radio capability to the gNB to implement a corresponding UE function, it should be understood that the sent radio capability information may include the reduced capability NR UE information, and the UE may in particular be a reduced capability NR UE and have corresponding reduced capability NR UE information.

In an implementation, a characteristic of the UE includes at least one of: a reduction of a number of UE RX/TX antennas, a reduction of a UE bandwidth, a half-duplex-frequency division duplexing (FDD), a relaxed UE processing time, or a relaxed UE processing capability.

In an implementation, the UE capability information is the reduced capability NR UE information, and the reduced capability NR UE information includes at least one of: reduced capability NR UE category information, reduced capability NR UE support indication information, reduced capability NR UE receiving capability information, reduced capability NR UE uploading capability information, UE transmission capability information, UE radio frequency capability information, or UE measurement capability information.

FIG. 2 is a flowchart of an information processing method provided in an embodiment of the present disclosure, and the embodiment of the present application is applicable to a case of uploading reduced capability NR UE information of a UE. Referring to FIG. 2, the technical scheme of the embodiments of the present application specifically includes the following.

In 201, radio capability information is sent to a gNB through an AMF.

In the embodiments of the present disclosure, when the UE uploads the radio capability information, the radio capability information of the UE may be sent to the gNB through the AMF, and the radio capability information in the AMF may be stored information sent by the UE.

In an implementation, that the radio capability information is sent to the gNB through the AMF includes the following.

In 211, a communication connection is established with the gNB so that the gNB sends initial UE information to the AMF, where the initial UE information at least includes one of service request information, attachment request information, or TAU request information.

In 212, the AMF sends an initial context establishment request to the gNB, where a UE radio capability cell of the initial context establishment request includes reduced capability NR UE information.

In 213, radio resource control (RRC) reconfiguration information determined by the gNB according to the reduced capability NR UE information is acquired, where the RRC reconfiguration information includes at least one of: reduced capability NR UE measurement configuration information, reduced capability NR UE radio resource configuration information, or reduced capability NR UE mobility control information.

FIG. 3 is an example diagram of an information processing method provided in an embodiment of the present application, referring to FIG. 3, in the embodiments of the present application, when the information that the UE supports the reduced capability NR UE capability is transferred through an AMF, a communication connection between the UE and a gNB may be established through an RRC MSG3, an RRC MSG4 and an RRC MSG5, where the RRC MSG3 message may correspond to a random access process Msg3, the RRC MSG3 may be specifically an RRC connection request, an RRC MSG4 message may correspond to a random access process Msg4, the RRC MSG4 may be an RRC connection establishment, and the RRC MSG5 message does not carry any actual message and only functions as an RRC layer confirmation, the RRC MSG5 may be an RRC connection establishment completion, after an RRC connection is established, initial UE information may be sent to the AMF by the gNB, after the AMF acquires the initial UE information, UE radio capability cell which sends the initial context establishment request to the gNB contains the reduced capability NR UE information. After acquiring the reduced capability NR UE information of the UE, the gNB may send an RRC reconfiguration to the UE, specifically may reconfigure the reduced capability NR UE of the UE, and specifically may include a reduced capability NR UE measurement configuration, a reduced capability NR UE radio resource configuration, and a reduced capability NR UE mobility control.

In another implementation, the gNB may actively enquiry reduced capability NR UE information supported by the UE, and the radio capability information is sent to the gNB through the AMF, which includes the following.

In 221, a communication connection is established with the gNB so that the gNB sends initial UE information to the AMF, where the initial UE information at least includes one of service request information, attachment request information, or TAU request information.

In 222, the AMF sends an initial context establishment request to the gNB, where a UE radio capability cell of the initial context establishment request does not include reduced capability NR UE information.

In 223, UE capability enquiry information sent by the gNB is received, and the radio capability information containing the reduced capability NR UE information is sent to the gNB so that the gNB sends a UE capability information indication to the AMF according to the radio capability information, where a UE radio capability cell contains the reduced capability NR information in the UE capability information indication.

FIG. 4 is an example diagram of an information processing method provided in an embodiment of the present application, and referring to FIG. 4, when a UE is in a capability change or a tracking area update (TAU) triggered by mobility or an attach phase, and when the AMF does not transmit in a service establishment, a gNB is required to actively enquiry reduced capability NR UE information supported by the UE, whereby a process of uploading the reduced capability NR UE information is realized, firstly, a communication connection between the UE and the gNB may be established through an RRC MSG3, an RRC MSG4 and an RRC MSG5, the RRC MSG3 message may correspond to a random access process Msg3, the RRC MSG3 may be specifically an RRC connection request, the RRC MSG4 message may correspond to a random access process Msg4, the RRC MSG4 is an RRC connection establishment, the RRC MSG5 message does not carry any actual message and only functions as an RRC layer confirmation, the RRC MSG5 may be an RRC connection establishment completion, after an RRC connection is established, initial UE information may be sent to the AMF by the gNB, the initial UE message may specifically include information such as a service request, an attach request and a TAU request, after the AMF acquires the initial UE information, the initial context establishment request is sent to the gNB, and at this time, the AMF does not store the reduced capability NR information of the UE, the initial context establishment request may not include UE radio capability information, the gNB queries a UE capability after acquiring the initial context establishment request, the UE may send UE capability information containing the reduced capability NR UE information to the gNB according to an enquiry request, and then the reduced capability NR UE information of the UE may be sent to the AMF by the gNB in a manner of a UE capability information indication and be stored.

FIG. 5 is a flowchart of another information processing method provided in an embodiment of the present application, the embodiment of the present application is applicable to a case of uploading reduced capability NR UE information of a UE, and this method may be executed by an information processing apparatus in the embodiment of the present application, where the apparatus may be implemented by software and/or hardware, and the method of the embodiment of the present application specifically includes the following.

In 301, when a random access message 1 is sent, the radio capability information is sent to the gNB through uplink RRC information; where the random access message 1 is used for configuring a dedicated resource containing a physical uplink shared channel in an idle mode.

FIG. 6 is an example diagram of an information processing method provided in an embodiment of the present application, referring to FIG. 6, and the UE may add reduced capability NR UE information to a random access message for sending when the UE sends a random access message 1 (Msg 1), where the random access message 1 may be an Msg 1 containing a random access preamble and a physical uplink shared channel (PUSCH) in a resource configuration process of a two-step physical random access channel (PRACH), and an Msg1 containing a physical uplink shared channel (PUSCH) and used for preconfiguring special resources in an idle mode. In the embodiments of the present application, the random access message 1 may specifically be reduced capability NR UE information carried through an uplink RRC message or a medium access control channel element (MAC CE) in a physical uplink shared channel, so that the UE radio capability information is explicitly reported.

In an implementation, that the radio capability information is sent to the gNB includes the following.

In 311, system information block (SIB) information sent by the gNB is acquired, where the SIB information includes PRACH resource configuration information corresponding to a reduced capability NR UE, and the PRACH resource configuration information corresponding to the reduced capability NR UE includes an uplink bandwidth part (BWP) common parameter and PRACH resource configuration information dedicated for sending the reduced capability NR UE, or the PRACH resource configuration information corresponding to the reduced capability NR UE includes uplink BWP configuration information configured dedicated for sending the reduced capability NR UE and PRACH resource configuration information corresponding to the uplink BWP configuration information.

In 312, the random access message 1 is sent to the gNB, where the radio capability information is represented in the random access message 1 by a random access preamble for the reduced capability NR UE only.

FIG. 7 is an example diagram of an information processing method provided in an embodiment of the present application, referring to FIG. 7, the UE may send the reduced capability NR UE information to the gNB by including the reduced capability NR UE information in the random access message 1, the SIB message may distinguish PRACH resources configured for the NR and reduced capability NR UE, and the reduced capability NR UE information may be implicitly determined by the SIB message. The UE may implicitly report the UE radio capability information in the random access message 1 sent only for the reduced capability NR UE in initiating the random access process, where the reduced capability NR UE information may be included.

At least one set of random access preamble is only used for the reduced capability NR UE, each random access preamble corresponds to one control resource set (CORESET), where the CORESET is used for determining a possible position of a downlink control channel, and the radio capability information is represented by sending the random access preamble on PRACH resources configured by the reduced capability NR UE.

A random access preamble independent of NR is configured for the reduced capability NR UE, information indicating the reduced capability NR UE capability is indicated in an implicit manner, multiple sets of access preambles of the reduced capability NR UE of the random access preamble independent of NR may be provided, each set of preamble may correspond to one CORESET, may be represented by PRACH resource configured for sending the reduced capability NR UE only in a common parameter of an uplink BWP (BWP-uplink common), and the UE is represented as the reduced capability NR UE in a manner of sending the preamble in any set of reduced capability NR UE preamble.

In an implementation, that the UE may report the reduced capability NR UE information by using an RRC message when sending the random access message 1 (MSG1) and send the radio capability information to the gNB includes the following.

In 321, SIB information sent by the gNB is acquired, where the SIB information includes PRACH resource configuration information corresponding to a reduced capability NR UE, and the PRACH resource configuration information corresponding to the reduced capability NR UE includes an uplink BWP common parameter and PRACH resource configuration information dedicated for sending the reduced capability NR UE, or the PRACH resource configuration information corresponding to the reduced capability NR UE includes uplink BWP configuration information configured dedicated for sending the reduced capability NR UE and PRACH resource configuration information corresponding to the uplink BWP configuration information.

In 322, a random access message 3 is sent to the gNB, and the random access message 3 includes the radio capability information.

The radio capability information implements the reduced capability NR UE information in at least one of following manners: the reduced capability NR UE information is explicitly included in the random access message 3 in at least one of following manners: the reduced capability NR UE information is indicated by using a reserved bit in an RRC establishment request, an RRC resume request, and/or an RRC reestablishment request; or the reduced capability NR UE information is indicated by using a reserved bit in an RRC establishment request, an RRC resume request, and/or an RRC reestablishment request dedicated for a reduced capability NR UE.

The radio capability information being implemented in the random access message 3 may be realized by means of indicating the reduced capability NR UE information by MAC CE, and the reduced capability NR UE information indicated by the MAC CE is implemented in one of following manners: the radio capability information is indicated by using a reserved bit in a reserved/logical channel identifier (R/LCID) MAC sub-header; or the radio capability information is indicated by using a reserved value of the LCID in the MAC sub-header.

Based on the embodiments of the present application described above, that the radio capability information is indicated by using the reserved value of the LCID in the MAC sub-header in the random access message 3 includes: a dedicated LCID value is defined for a reduced capability NR UE, and the dedicated LCID value is used for indicating both random access message 3 related information and the radio capability information.

Figure 8:
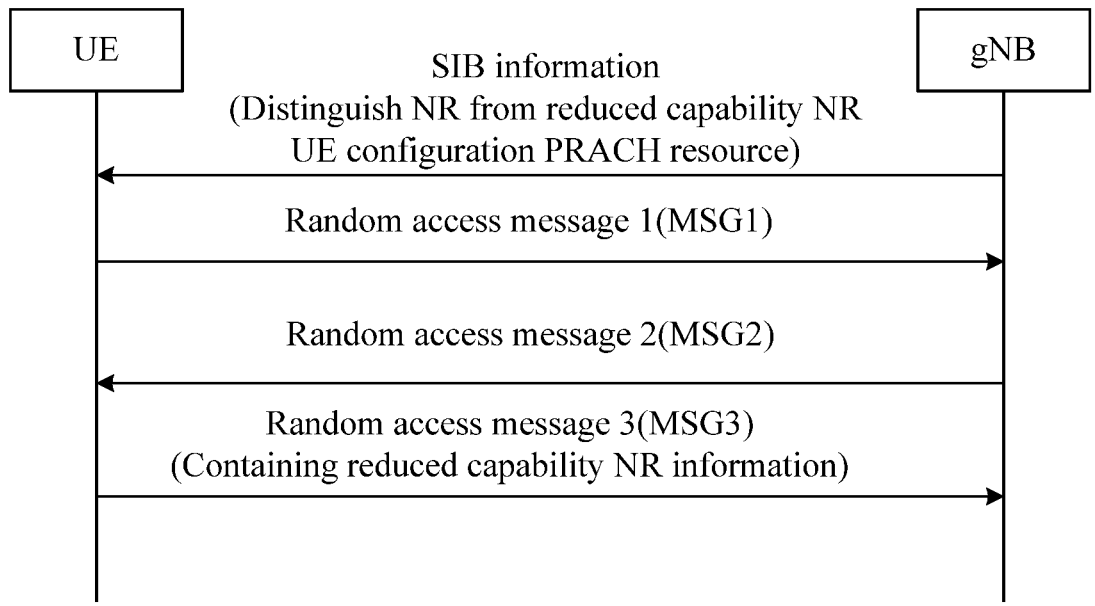
FIG. 8 is an example diagram of an information processing method provided in an embodiment of the present application.

In the embodiment of the present disclosure, referring to FIG. 8, the reduced capability NR UE information of the UE may be sent through the random access message 3, on the basis of differentiating PRACH resources configured for the NR and the reduced capability NR UE using an SIB message, the UE will initiate a random access process, and the UE sends a random access message 1 (MSG1) to the gNB and accepts a random access message 2 (MSG2) sent by the gNB. The UE, upon sending a random access message 3 (MSG3) to the gNB, may upload UE radio capability information, which may in particular be reduced capability NR UE information, in the random access message 3. It should be understood that the manner in which the reduced capability NR UE information is sent through the random access message 3 may include both an explicit manner and an implicit manner, where the explicit sending at least includes one of following manners.

In the information of the RRC establishment request, the resume request and/or the reestablishment request, the UE utilizes a reserved bit in the information to distinguish NR UE capability information from the reduced capability NR UE information, that is, the gNB determines whether the UE is the reduced capability NR UE according to a reserved bit value; for example, in the RRC establishment request, one bit reserved in this information being defined as 1 represents the reduced capability NR UE information; based on the RRC establishment request, resume request and/or reestablishment request of the NR UE, the RRC establishment request, resume request and/or reestablishment request only for the reduced capability NR UE is added, and the reduced capability NR UE information is carried for dedicated RRC establishment request, resume request and/or reestablishment request in the reduced capability NR UE; for example, with respect to the RRC establishment request of NR UE, on the basis of this, one reserved bit is extended to nine reserved bits, and the RRC establishment request is defined as the RRC establishment request dedicated for the reduced capability NR UE, and then one bit of nine reserved bit being defined as 1 represents the reduced capability NR UE information.

Figure 9:
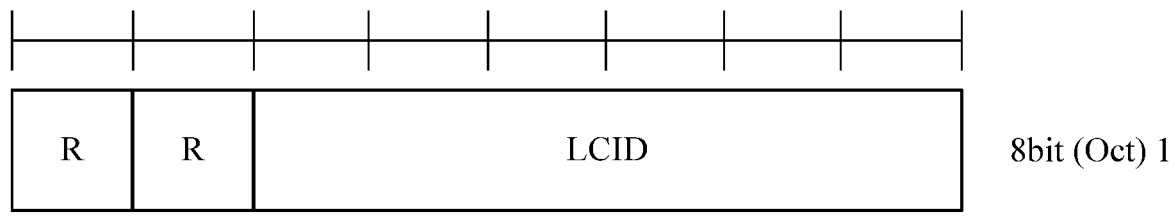
FIG. 9 is a schematic diagram of an R/LCID MAC sub-header provided in an embodiment of the present application.

For R/LCID MAC sub-header accompanying in the random access message 3, referring to FIG. 9, any one bit of two reserved bits may be used for distinguishing the NR UE capability information from the reduced capability NR UE information, that is, the gNB determines whether it is the reduced capability NR UE information according to the reserved bit value of the R/LCID MAC sub-header; for example, in the R/LCID MAC sub-header, when a second reserved bit being defined as 1 represents the reduced capability NR UE information. Exemplarily, LCID values in the uplink shared channel may be as follows.

TABLE 1

LCID values for the uplink shared channel

| Index | LCID values |
|---|---|
| 0 | CCCH of size 64 bits (referred to as "CCCH1" in TS 38.331 [5]) |
| 1-32 | Identity of the logical channel |
| 33-51 | Reserved |
| 52 | CCCH of size 48 bits (referred to as "CCCH" in TS 38.331 [5]) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

An implicit sending is implemented in following manners: for the reserved value of the LCID in the MAC sub-header transmitted on the uplink shared channel, a dedicated LCID value is defined by using the random access message 3 having a reserved value of the reduced capability NR UE, and the gNB knows that the UE is a reduced capability NR UE according to the received dedicated LCID value, for example, it is considered that a range of the LCID is from 0 to 63 and the range of the reserved values of the LCID is from 33 to 51, then a LCID value Y in the MAC CE is selected to represent that the reduced capability NR UE information and the random access message 3 are transmitted on the common control channel (CCCH) of size 48 bit, and/or a LCID value Z in the MAC CE is selected to represent that the reduced capability NR UE information and the random access message 3 are transmitted on the CCCH of size 64 bit, where Y and Z are any integer values from 33 to 51; and may be defined by other values among the reserved value. The reduced capability NR UE is used as an example, it is also applicable to a high-performance terminal and a terminal with limited capabilities.

In an implementation, the reduced capability NR UE information is carried through a resource corresponding to acknowledgement/negative acknowledgement (ACK/NACK) feedback information corresponding to a random access message 4, and the radio capability information is sent to the gNB.

That the reduced capability NR UE information is carried through the resource corresponding to the ACK/NACK feedback information corresponding to the random access message 4 is achieved through the following.

In 331, the reduced capability NR UE information is carried through sending a resource corresponding to ACK/NACK feedback information corresponding to the random access message 4 to the gNB, and the radio capability information is included in the feedback information of the random access message 4.

That the reduced capability NR UE information is carried through the resource corresponding to the ACK/NACK feedback information corresponding to the random access message 4 specifically includes at least one of: the radio capability information is indicated by using a resource index corresponding to the ACK/NACK feedback information; both the ACK/NACK feedback information and the radio capability information is transmitted to the gNB through a physical uplink control channel; or the radio capability information is indicated by using a scrambling code or a reference signal sequence corresponding to the ACK/NACK feedback information.

FIG. 10 is an example diagram of an information processing method provided in an embodiment of the present application, and referring to FIG. 10, a UE may send reduced capability NR UE information to a gNB by including the capability information in ACK/NACK feedback information of a random access message 4. It should be understood that three manners of sending the reduced capability NR UE information through the feedback information of the random access message 4 may be included, where a manner one is that the radio capability information is indicated by using a resource index corresponding to the ACK/NACK feedback information; a manner two is that both the ACK/NACK feedback information and the radio capability information is transmitted to the gNB through a physical uplink control channel; and a manner three is that the radio capability information is indicated by using a scrambling code or a reference signal sequence corresponding to the ACK/NACK feedback information.

FIG. 11 is a flowchart of an information processing method provided in an embodiment of the present application, the embodiment of the present application is applicable to a case of uploading reduced capability NR UE information of a UE, and this method may be executed by an information processing apparatus in the embodiment of the present application, where the apparatus may be implemented by software and/or hardware and generally integrated in the UE, referring to FIG. 11, and the method of the embodiment of the present application specifically includes the following.

In 401, radio capability information is forwarded to a target gNB through a source gNB.

In an implementation, that the radio capability information is forwarded to the target gNB through the source gNB includes the following.

In 411, handover request information is sent to the target gNB through the source gNB, where a source to target transparent container cell of the handover request information contains the reduced capability NR UE information.

In 412, handover request confirmation information sent by the target gNB is received by the source gNB after a resource admission qualification of the target gNB is obtained and an allocation of a resource required based on reduced capability NR UEs in the target gNB is completed.

Referring to FIG. 12, the reduced capability NR UE information of the UE transmitted during an Xn port based inter-gNB handover is used as an example, the source gNB may store the reduced capability NR UE information reported by the UE, and when the source gNB sends a handover request message to the target gNB, the reduced capability NR UE information of the UE may be added to the handover request message, in particular to a source to target transparent container cell. After the handover request is received by the target gNB, the target gnb may send a handover request acknowledge to the source gNB, where resources allocated by the target gNB according to the reduced capability NR UE information of the UE may be included in the handover request acknowledgement.

In an implementation, that the radio capability information is forwarded to the target gNB through the source gNB includes the following.

In 421, handover required information is sent to the AMF via the source gNB, and handover request information is forwarded to a target gNB by the AMF, where a source to target transparent container cell of the handover required information and the handover request information contains reduced capability NR UE information.

In 422, after a resource admission qualification of the target gNB is obtained and an allocation of a resource required based on reduced capability NR UEs in the target gNB is completed, handover request confirmation information sent by the target gNB is forwarded to the source gNB by using a handover command through the AMF.

Figure 13:
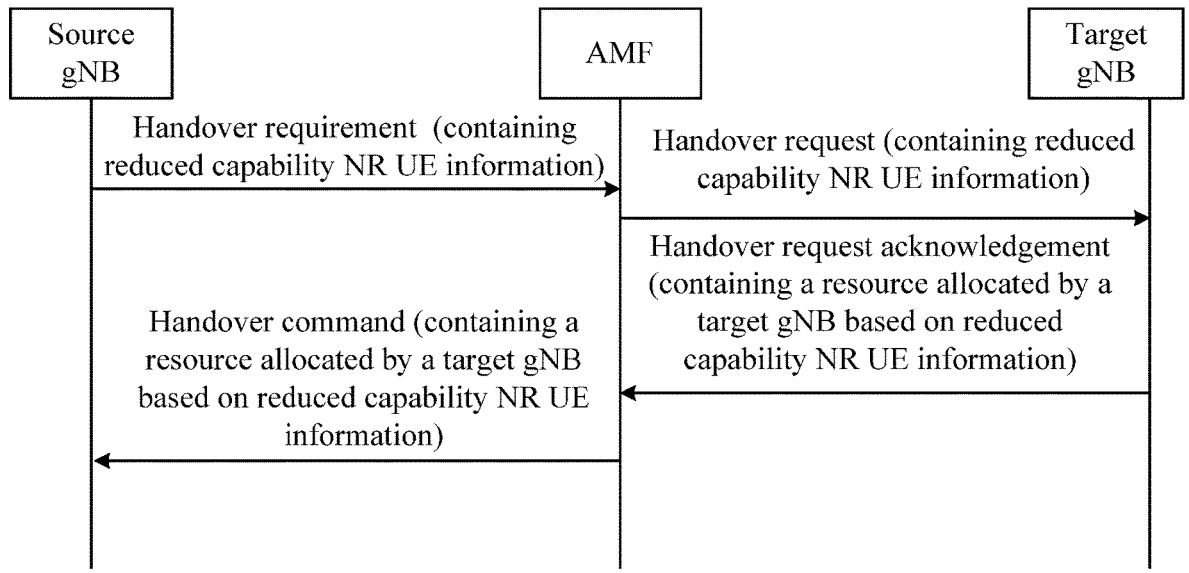
FIG. 13 is an example diagram of an information processing method provided in an embodiment of the present application.

Referring to FIG. 13, in the embodiment of the present application, transmitting reduced capability NR UE information supported by a UE during handover based on NG interfaces is used as an example, during inter-gNB handover based on NG interfaces, the reduced capability NR UE information of the UE may be sent to a target gNB through a source gNB and an AMF, the acquired Reduced capability NR UE information of the UE may be included in handover required information by the source gNB, specifically, the AMF may send a handover request message to the target gNB in a source to transparent container cell, the source to transparent container cell of the handover request message contains the reduced capability NR UE information, the target gNB may determine a resource admission qualification of the UE at the target gNB according to the reduced capability NR UE information, the target gNB sends a handover request acknowledge message to the AMF, where the target to source container may include resources allocated according to the reduced capability NR information, and the AMF may then send a handover command message to the source gNB, the target to source container cell contains that an allocation of a resource required based on reduced capability NR UEs in the target gNB is completed. In an implementation, a number of AMFs includes at least one. The reduced capability NR UE information of the UE may be transferred to the target gNB through different AMFs during handover based on NG interfaces.

Figure 14:
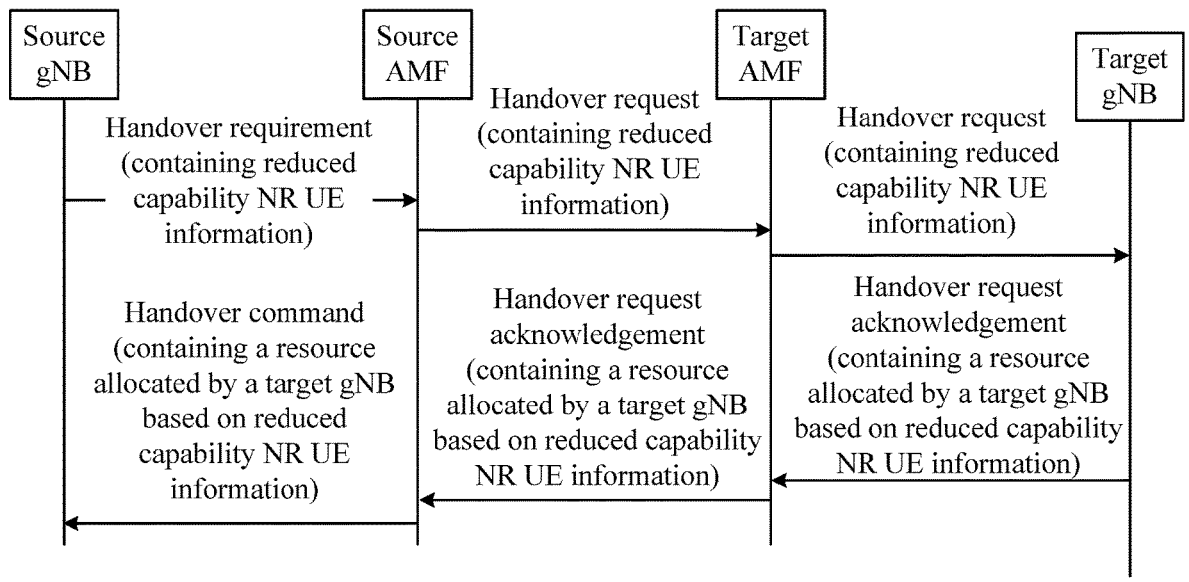
FIG. 14 is an example diagram of an information processing method provided in an embodiment of the present application.

Exemplarily, FIG. 14 is an example diagram of an information processing method provided in an embodiment of the present application, referring to FIG. 14, an example in which reduced capability NR UE information supported by the UE is transferred during handover based on NG interfaces and in different AMFs is used for illustration, firstly, a source gNB may send a handover required information to a source AMF, where a source to target transparent container cell contains the reduced capability NR UE information. The source AMF sends a handover required message to the target AMF, where the source to target transparent container cell contains the reduced capability NR UE information. The target AMF sends a handover request message to the target gNB, where the source to target transparent container cell contains the reduced capability NR UE information. After a target gNB resource admission for the reduced capability NR UE is obtained, the target gNB sends a handover request acknowledge message to the target AMF, where the target to source transparent container cell contains that an allocation of a resource required based on reduced capability NR UEs in the target gNB is completed. The target AMF sends a handover request acknowledge message to the source AMF, where the target to source transparent container cell contains that an allocation of a resource required based on reduced capability NR UEs in the target gNB is completed. The source AMF sends a handover command message to the source gNB, where the target to source transparent container cell contains that an allocation of a resource required based on reduced capability NR UEs in the target gNB is completed. According to the technical scheme provided in the embodiment of the present application, the radio capability information containing the reduced capability NR UE information is sent to the gNB, so that the capability supported by the UE is acquired by the gNB, related resources are distributed for the UE, a corresponding function of the UE is realized, the usability of a UE service is guaranteed, and the user experience degree is improved.

Figure 15:
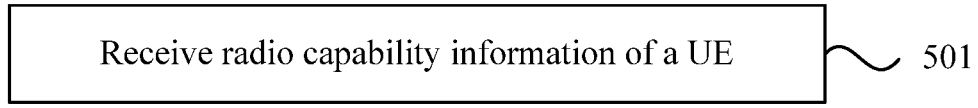
FIG. 15 is a flowchart of an information processing method provided in an embodiment of the present application.

FIG. 15 is a flowchart of an information processing method provided in an embodiment of the present application, the embodiment of the present application is applicable to a case of uploading reduced capability NR UE information of a UE, and this method may be executed by an information processing apparatus in the embodiment of the present application, where the apparatus may be implemented by software and/or hardware and generally integrated in the UE, and the method of the embodiment of the present application specifically includes the following.

In 501, radio capability information of a UE is received; where the radio capability information includes UE capability information.

In an implementation, a characteristic of the UE includes at least one of: a reduction of a number of UE RX/TX antennas, a reduction of a UE bandwidth, a half-duplex FDD, a relaxed UE processing time, or a relaxed UE processing capability.

In an implementation, the UE capability information being the reduced capability NR UE information includes at least one of: reduced capability NR UE category information, reduced capability NR UE support indication information, reduced capability NR UE receiving capability information, reduced capability NR UE uploading capability information, UE transmission capability information, UE robust header compression (ROHC) capability information, UE radio frequency capability information, or UE measurement capability information.

In an implementation, that the radio capability information of the UE is received includes: radio capability information sent by an access and mobility management function (AMF) is received.

That the radio capability information sent by the AMF is received includes the following.

In 511, a communication connection is established with the UE, and initial UE information is sent to the AMF, where the initial UE information at least includes one of service request information, attachment request information, or TAU request information.

In 512, an initial context establishment request sent by the AMF is acquired, where a UE radio capability cell of the initial context establishment request includes the reduced capability NR UE information.

In 513, RRC reconfiguration information is determined according to the reduced capability NR UE information, and the RRC reconfiguration information is sent to the UE, where the RRC reconfiguration information includes at least one of: reduced capability NR UE measurement configuration information, reduced capability NR UE radio resource configuration information, or reduced capability NR UE mobility control information.

In an implementation, that the radio capability information sent by the AMF is received includes the following.

In 521, a communication connection is established with the UE, and initial UE information is sent to the AMF, where the initial UE information at least includes one of service request information, attachment request information, or TAU request information.

In 522, acquire an initial context establishment request sent by the AMF is acquired, where a UE radio capability cell of the initial context establishment request includes the reduced capability NR UE information.

In 523, UE capability enquiry information is sent to the UE, and radio capability information including the reduced capability NR UE information and sent by the UE is received.

In 524, a UE capability information indication is sent to the AMF according to the radio capability information, where a UE radio capability cell in the UE capability information indication includes the reduced capability NR UE information.

In another implementation, that the radio capability information sent by the UE is received includes the following.

In 601, the radio capability information sent through uplink RRC information is acquired when the UE sends a random access message 1; where the random access message 1 is used for configuring a dedicated resource containing a physical uplink shared channel in an idle mode.

Based on the embodiments of the present application described above, in an implementation, that the radio capability information of the UE is received includes that the radio capability information sent by the UE is received.

In an implementation, the radio capability information sent by the UE is received may further include the following.

In 701, SIB information is sent to the UE, where the SIB information includes PRACH resource configuration information corresponding to a reduced capability NR UE, and the PRACH resource configuration information corresponding to the reduced capability NR UE includes an BWP common parameter and PRACH resource configuration information configured dedicated for sending the reduced capability NR UE, or the PRACH resource configuration information corresponding to the reduced capability NR UE includes uplink BWP configuration information configured dedicated for sending the reduced capability NR UE and PRACH resource configuration information corresponding to the uplink BWP configuration information.

In 702, a PRACH sent by the UE is received, where the PRACH is located in a PRACH resource set corresponding to the reduced capability NR UE.

Based on the embodiments of the present application described above, the random access preamble used only for the reduced capability NR UE is at least one set, and each random access preamble corresponds to one CORESET, and the radio capability information is represented by sending the random access preamble in a PRACH resource configured by the reduced capability NR UE.

In an implementation, that the radio capability information sent by the UE is received includes the following.

In 801, SIB information is sent to the UE, where the SIB information includes PRACH resource configuration information corresponding to a reduced capability NR UE, and the PRACH resource configuration information corresponding to the reduced capability NR UE includes an BWP common parameter and PRACH resource configuration information configured dedicated for sending the reduced capability NR UE, or the PRACH resource configuration information corresponding to the reduced capability NR UE includes uplink BWP configuration information configured dedicated for sending the reduced capability NR UE and PRACH resource configuration information corresponding to the uplink BWP configuration information.

In 802, a random access message 3 sent by the UE is acquired, where the random access message 3 includes the radio capability information.

Based on the embodiments of the present application described above, the radio capability information indicates the radio capability information through the MAC CE in the random access message 3 in at least one of following manners: the radio capability information is indicated by using a reserved bit in an R/LCID MAC sub-header; or the radio capability information is indicated by using a reserved value of a LCID in a MAC sub-header, where the reserved value defines a dedicated LCID value for reduced capability NR UEs that indicates both random access message 3 related information and the radio capability information.

In an implementation, the radio capability information sent by the UE is received includes the following.

In 901, radio capability information is forwarded by the source gNB.

Based on the embodiments of the present application described above, that the radio capability information is forwarded by the source gNB includes the following.

In 911, handover request information sent by the UE is acquired through the source gNB; where a source to target transparent container cell of the handover request information contains the reduced capability NR UE information.

In 912, handover request confirmation information is forwarded to the UE by the source gNB after a resource admission qualification of the target gNB of the UE is determined and an allocation of a resource required based on reduced capability NR UEs in the target gNB is completed.

In an implementation, that the radio capability information is forwarded through the source gNB includes the following.

In 921, the UE acquires handover request information forwarded by the AMF by sending the handover request information to the AMF through the source gNB, where the source to target transparent container cell of the handover request information contains the reduced capability NR UE information.

In 922, the handover request confirmation information is forwarded to the target gNB through the AMF after a resource admission qualification of the target gNB of the UE is determined and an allocation of a resource required based on reduced capability NR UEs in the target gNB is completed.

Based on the embodiments of the present application described above, a number of AMFs is at least one.

According to the technical scheme provided in the embodiments of the present application, radio capability information containing reduced capability NR UE information sent by the UE is received, so that an allocation of a resource for the capabilities supported by the UE is realized, a corresponding function of the UE is realized, the usability of a UE service is guaranteed, and the user experience degree is improved.

Figure 16:
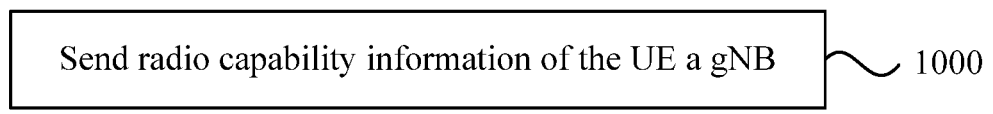
FIG. 16 is a flowchart of an information processing method provided in an embodiment of the present application.

FIG. 16 is a flowchart of an information processing method provided in an embodiment of the present application, the embodiment of the present application is applicable to a case of uploading reduced capability NR UE information of a UE, and this method may be executed by an information processing apparatus in the embodiment of the present application, where the apparatus may be implemented by software and/or hardware and generally integrated in the AMF, and the method of the embodiment of the present application specifically includes the following.

In 1000, radio capability information of the UE is sent to a gNB; where the radio capability information includes UE capability information.

In an implementation, a characteristic of the UE includes at least one of: a reduction of a number of UE RX/TX antennas, a reduction of a UE bandwidth, a half-duplex-frequency division duplexing (FDD), a relaxed UE processing time, or a relaxed UE processing capability.

In an implementation, the UE capability information is reduced capability NR UE information, and the reduced capability NR UE information includes at least one of: reduced capability NR UE category information, reduced capability NR UE support indication information, reduced capability NR UE receiving capability information, reduced capability NR UE uploading capability information, UE transmission capability information, UE radio frequency capability information, or UE measurement capability information.

In an implementation, that the radio capability information of the UE is sent to the gNB includes the following.

In 1101, initial UE information sent by the gNB is received after the gNB establishes a communication connection with the UE, where the initial UE information at least includes one of service request information, attachment request information, or TAU request information.

In 1102, an initial context establishment request is sent to the gNB, where a UE radio capability cell of the initial context establishment request includes reduced capability NR UE information.

In 1103, the gNB is caused to determine the RRC reconfiguration information according to the reduced capability NR UE information, where the RRC reconfiguration information includes at least one of: reduced capability NR UE measurement configuration information, reduced capability NR UE radio resource configuration information, or reduced capability NR UE mobility control information.

In an implementation, that the radio capability information of the UE is sent to the gNB includes the following.

In 1201, initial UE information sent by the gNB is received after the gNB establishes a communication connection with the UE, where the initial UE information at least includes one of service request information, attachment request information, or TAU request information.

In 1202, an initial context establishment request is sent to the gNB, where a UE radio capability cell of the initial context establishment request includes reduced capability NR UE information.

In 1203, a UE capability information indication sent by the gNB is acquired, where the UE capability information indication is determined by the gNB through enquiring UE capability enquiry information of the UE, and a UE capability cell in the UE capability information indication includes the reduced capability NR information.

In an implementation, that the radio capability information of the UE is sent to the gNB includes the following.

In 1301, the radio capability information forwarded by the source gNB is acquired, and the radio capability information is forwarded to the target gNB.

Based on the embodiments of the present application described above, that the radio capability information forwarded by the source gNB is acquired, and the radio capability information is forwarded to the target gNB includes the following.

In 1311, handover required information sent by a source gNB is acquired; where a source to target transparent container cell of the handover required information contains reduced capability NR UE information.

In 1312, the handover request information is forwarded to the target gNB.

In 1313, after a resource admission qualification of the target gNB is obtained by the UE and an allocation of a resource required based on reduced capability NR UEs in the target gNB is completed, handover request confirmation information sent by the target gNB is forwarded to the source gNB by using a handover command.

Based on the embodiments of the present application described above, that the radio capability information forwarded by the source gNB is acquired, and the radio capability information is forwarded to the target gNB includes the following.

In 1321, handover request information forwarded by a source gNB through a source AMF is acquired, and the handover request information is forwarded to the target gNB, where a source to target transparent container cell of the handover request information contains the reduced capability NR UE information.

In 1322, after a resource admission qualification of the target gNB is obtained by the UE and an allocation of a resource required based on reduced capability NR UEs in the target gNB is completed, handover request confirmation information sent by the target gNB is forwarded to the source gNB.

According to the technical scheme provided in the embodiment of the present application, the radio capability information containing the reduced capability NR UE information is sent to the gNB, so that the capability supported by the UE is acquired by the gNB, related resources are distributed for the UE, a corresponding function of the UE is realized, the usability of a UE service is guaranteed, and the user experience degree is improved.

Figure 17:
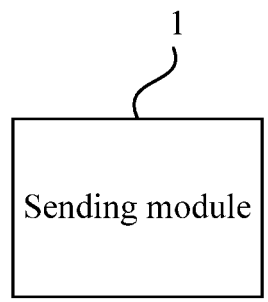
FIG. 17 is a schematic structural diagram of an information processing apparatus according to an embodiment of the present application.

FIG. 17 is a schematic structural diagram of an information processing apparatus according to an embodiment of the present application, the information processing apparatus may execute the information processing method provided in any of the embodiments of the present application, and has functional modules and advantageous effects corresponding to the executed method. The apparatus may be implemented by software and/or hardware and may generally be integrated into a UE. The apparatus specifically includes a sending module 1. The sending module 1 is configured to send radio capability information to a next generation NodeB (gNB); where the radio capability information includes UE capability information.

According to the technical scheme provided in the embodiments of the present application, the radio capability information containing reduced capability NR UE information is sent to the gNB by the sending module, so that the capability supported by the UE is acquired by the gNB, related resources are distributed for the UE, a corresponding function of the UE is realized, the usability of a UE service is guaranteed, and the user experience degree is improved.

Based on the embodiments of the present application described above, a characteristic of the UE in the sending module 1 includes at least one of: a reduction of a number of UE RX/TX antennas, a reduction of a UE bandwidth, a half-duplex FDD, a relaxed UE processing time, or a relaxed UE processing capability.

Based on the embodiments of the present application described above, the reduced capability NR radio capability information in the sending module 1 includes at least one of: reduced capability NR UE category information, reduced capability NR UE support indication information, reduced capability NR UE receiving capability information, reduced capability NR UE uploading capability information, UE transmission capability information, UE radio frequency capability information, or UE measurement capability information.

Based on the embodiments of the present application described above, the sending module 1 includes a feedback response unit. The feedback response unit is configured to receive UE capability enquiry information sent by the gNB, and send the radio capability information containing the reduced capability NR UE information to the gNB.

Based on the embodiments of the present application described above, the sending module 1 includes an AMF sending unit. The AMF sending unit is configured to send the radio capability information to the gNB through an AMF.

Based on the embodiments of the present application described above, the AMF sending unit is specifically configured to: establish a communication connection with the gNB so that the gNB sends initial UE information to the AMF, where the initial UE information at least includes one of service request information, attachment request information, or TAU request information; send, by the AMF, an initial context establishment request to the gNB, where a UE radio capability cell of the initial context establishment request includes reduced capability NR UE information; acquire RRC reconfiguration information determined by the gNB according to the reduced capability NR UE information, where the RRC reconfiguration information includes at least one of: reduced capability NR UE measurement configuration information, reduced capability NR UE radio resource configuration information, or reduced capability NR UE mobility control information.

Based on the embodiments of the present application described above, the AMF sending unit is further configured to: establish a communication connection with the gNB so that the gNB sends initial UE information to the AMF, where the initial UE information at least includes one of service request information, attachment request information, or TAU request information; send, by the AMF, an initial context establishment request to the gNB; receive UE capability enquiry information sent by the gNB, and send the radio capability information containing the reduced capability NR UE information to the gNB so that the gNB sends a UE capability information indication to the AMF according to the radio capability information, where a UE radio capability cell contains the reduced capability NR information in the UE capability information indication.

Based on the embodiments of the present application described above, the sending module 1 further includes an access message unit. The access message unit is configured to send, in a case of sending a random access message 1, the radio capability information to the gNB through uplink RRC information; where the random access message 1 is used for configuring a dedicated resource containing a physical uplink shared channel in an idle mode.

Based on the embodiments of the present application described above, the sending module 1 further includes a first SIB information unit. The first SIB information unit is configured to: acquire system information block (SIB) information sent by the gNB, where the SIB information includes PRACH resource configuration information corresponding to a reduced capability NR UE, and the PRACH resource configuration information corresponding to the reduced capability NR UE includes an uplink BWP common parameter and PRACH resource configuration information dedicated for sending the reduced capability NR UE, or the PRACH resource configuration information corresponding to the reduced capability NR UE includes uplink BWP configuration information configured dedicated for sending the reduced capability NR UE and PRACH resource configuration information corresponding to the uplink BWP configuration information; and send a random access message 1 to the gNB.

Based on the embodiments of the present application described above, the random access message 1 in the access message unit has at least one set of random access preambles, and each random access preamble corresponds to one CORESET, and a random access preamble representing the radio capability information is included in the PRACH resource configuration information corresponding to the reduced capability NR UE.

Based on the embodiments of the present application described above, the sending module 1 further includes a second SIB information unit. The second SIB information unit is configured to send a random access message 3 to the gNB, where the random access message 3 includes the radio capability information.

Based on the embodiments of the present application described above, the radio capability information in the second SIB information unit implements the reduced capability NR UE information in the random access message 3 in at least one of following manners: the reduced capability NR UE information is indicated by using a reserved bit in an RRC establishment request, an RRC resume request, and/or an RRC reestablishment request; or the reduced capability NR UE information is carried by using an RRC establishment request, an RRC resume request, and/or an RRC reestablishment request dedicated for a reduced capability NR UE.

Based on the embodiments of the present application described above, the MAC CE in the random access message 3 indicates the reduced capability NR UE information, which is implemented in one of following manners: the radio capability information is indicated by using a reserved bit in a R/LCID MAC sub-header; or the radio capability information is indicated by using a reserved value of a LCID in a MAC sub-header.

Based on the embodiments of the present application described above, that the radio capability information is indicated by using the reserved value of the LCID in the MAC sub-header in the random access message 3 includes: a dedicated LCID value is defined for a reduced capability NR UE, and the dedicated LCID value is used for indicating both random access message 3 related information and the radio capability information.

Based on the embodiments of the present application described above, the sending module 1 is further configured to carry the reduced capability NR UE information through sending a resource corresponding to ACK/NACK feedback information corresponding to the random access message 4 to the gNB, and the radio capability information is included in the feedback information of the random access message 4.

That the radio capability information implements the reduced capability NR UE information through the ACK/NACK feedback information corresponding to the random access message 4 includes at least one of following manners: the radio capability information is indicated by using a resource index corresponding to the ACK/NACK feedback information; both the ACK/NACK feedback information and the radio capability information is transmitted to the gNB through a physical uplink control channel; or the radio capability information is indicated by using a scrambling code or a reference signal sequence corresponding to the ACK/NACK feedback information.

Based on the embodiments of the present application described above, the sending module 1 further includes a gNB sending unit. The gNB sending unit is configured to forward the radio capability information to the target gNB through the source gNB.

Based on the embodiments of the present application described above, the gNB sending unit is specifically configured to: send handover request information to the target gNB through the source gNB, where a source to target transparent container cell of the handover request information contains reduced capability NR UE information; receive, by the source gNB, handover request confirmation information sent by the target gNB after a resource admission qualification of the target gNB is obtained and an allocation of a resource required based on reduced capability NR UEs in the target gNB is completed.

Based on the embodiments of the present application described above, the gNB sending unit is specifically configured to: send, by the source gNB, handover required information to the AMF; forward, by the AMF, the handover request information to the target gNB, where a source to target transparent container cell of the handover required information and the handover request information contains reduced capability NR UE information; and forward, by the AMF, handover request confirmation information sent by the target gNB to the source gNB by using a handover command after a resource admission qualification of the target gNB is obtained and an allocation of a resource required based on reduced capability NR UEs in the target gNB is completed.

Based on the embodiments of the present application described above, the gNB sending unit includes at least one AMF.

Figure 18:
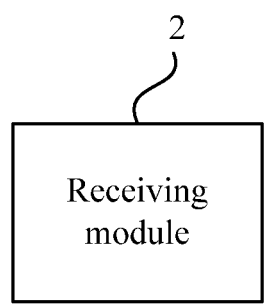
FIG. 18 is a schematic structural diagram of another information processing apparatus provided in an embodiment of the present application.

FIG. 18 is a schematic structural diagram of an information processing apparatus provided in an embodiment of the present application. The information processing apparatus may execute the information processing method provided in any of the embodiments of the present application, and has functional modules and advantageous effects corresponding to the executed method. The apparatus may be implemented by software and/or hardware and may generally be integrated into a gNB. The apparatus specifically includes a receiving module 2. The receiving module 2 is configured to receive radio capability information sent a user equipment (UE); where the radio capability information includes UE capability information.

According to the technical scheme provided in the embodiments of the present application, radio capability information containing reduced capability NR UE information sent by the UE is received through the receiving module, so that an allocation of a resource for the capabilities supported by the UE is realized, a corresponding function of the UE is realized, the usability of a UE service is guaranteed, and the user experience degree is improved.

Based on the embodiments of the present application described above, a characteristic of the UE in the receiving module 2 includes at least one of: a reduction of a number of UE RX/TX antennas, a reduction of a UE bandwidth, a half-duplex FDD, a relaxed UE processing time, or a relaxed UE processing capability.

Based on the embodiments of the present application described above, the UE capability information in the receiving module 2 is the reduced capability NR UE information, and includes at least one of: reduced capability NR UE category information, reduced capability NR UE support indication information, reduced capability NR UE receiving capability information, reduced capability NR UE uploading capability information, UE transmission capability information, UE radio frequency capability information, or UE measurement capability information.

Based on the embodiments of the present application described above, the receiving module 2 includes an AMF receiving unit. The AMF receiving unit is configured to receive radio capability information sent by the UE via the AMF.

Based on the embodiments of the present application described above, the AMF receiving unit is specifically configured to: establish a communication connection with the UE, and send initial UE information to the AMF, where the initial UE information at least includes one of service request information, attachment request information, or TAU request information; acquire an initial context establishment request sent by the AMF, where a UE radio capability cell of the initial context establishment request includes the reduced capability NR UE information; and determine RRC reconfiguration information according to the reduced capability NR UE information and issue the RRC reconfiguration information to the UE, where the RRC reconfiguration information includes at least one of: reduced capability NR UE measurement configuration information, reduced capability NR UE radio resource configuration information, or reduced capability NR UE mobility control information.

Based on the embodiments of the present application described above, the AMF receiving unit is further configured to: establish a communication connection with the UE, and send initial UE information to the AMF, where the initial UE information at least includes one of service request information, attachment request information, or TAU request information; acquire an initial context establishment request sent by the AMF, where a UE radio capability cell of the initial context establishment request includes the reduced capability NR UE information; send UE capability enquiry information to the UE, and receive radio capability information including the reduced capability NR UE information sent by the UE; and send a UE capability information indication to the AMF according to the radio capability information, where the reduced capability NR information is contained in the UE radio capability cell in the UE capability information indication.

Based on the embodiments of the present application described above, the receiving module 2 further includes an access message unit. The access message unit is configured to acquire the radio capability information sent through uplink RRC information when the UE sends a random access message 1; where the random access message 1 is used for configuring a dedicated resource containing a physical uplink shared channel in an idle mode.

Based on the embodiments of the present application described above, the receiving module 2 further includes a first SIB receiving unit. The first SIB receiving unit is configured to: send SIB information to the UE, where the SIB information corresponds to a reduced capability NR UE configuration PRACH resource, the reduced capability NR UE configuration PRACH resource is a PRACH resource configured dedicated for sending a reduced capability NR UE in an uplink BWP common parameter, or is an uplink BWP parameter configured dedicated for sending the reduced capability NR UE and a PRACH resource corresponding to the uplink BWP parameter; and receive a random access message 1 sent by the UE, where the radio capability information is represented in the random access message 1 by a random access preamble for only the reduced capability NR UE.

Based on the embodiments of the present application described above, the random access preamble used only for the reduced capability NR UE in the first SIB receiving unit is at least one set, and each random access preamble corresponds to one CORESET, and the radio capability information is represented by sending the random access preamble in a PRACH resource configured by the reduced capability NR UE.

Based on the embodiments of the present application described above, the receiving module 2 further includes a second SIB receiving unit. The second SIB receiving unit is configured to: send SIB information to the UE, where the SIB information corresponds to a reduced capability NR UE configuration PRACH resource, the reduced capability NR UE configuration PRACH resource is a PRACH resource configured dedicated for sending a reduced capability NR UE in an uplink BWP common parameter, or is an uplink BWP parameter configured dedicated for sending a reduced capability NR UE and a PRACH resource corresponding to the uplink BWP parameter; and acquire a random access message 3 sent by the UE, where the random access message 3 includes the radio capability information.

Based on the embodiments of the present application described above, the radio capability information in the second SIB receiving unit implements the reduced capability NR UE information in at least one of following manners: the reduced capability NR UE information is explicitly included in the random access message 3 in at least one of following manners: the radio capability information is indicated by using a reserved bit in an RRC establishment request, an RRC resume request, and/or an RRC reestablishment request; or the radio capability information is carried by using an RRC establishment request, an RRC resume request, and/or an RRC reestablishment request dedicated for a reduced capability NR UE.

The MAC CE in the random access message 3 indicates the reduced capability NR UE information, which is implemented in one of following manners: the radio capability information is explicitly indicated by using any one bit of two reserved bit in the R/LCID MAC sub-header; or a dedicated LCID value is defined for the reduced capability NR UE, the dedicated LCID value is used for indicating both random access message 3 related information and radio capability information.

Based on the embodiments of the present application described above, the receiving module 2 is further configured to carry the reduced capability NR UE information through sending a resource corresponding to ACK/NACK feedback information corresponding to the random access message 4 to the gNB, and the radio capability information is included in the feedback information of the random access message 4.

The radio capability information implements the reduced capability NR UE information in at least one of following manners: the radio capability information is indicated by using a resource index corresponding to the ACK/NACK feedback information; both the ACK/NACK feedback information and the radio capability information is transmitted to the gNB through a physical uplink control channel; or the radio capability information is indicated by using a scrambling code or a reference signal sequence corresponding to the ACK/NACK feedback information.

Based on the embodiments of the present application described above, the receiving module 2 includes a gNB receiving module. The gNB receiving module is configured to forward the radio capability information through the source gNB.

Based on the embodiments of the present application described above, the gNB receiving module is specifically configured to: acquire handover request information sent by the UE through the source gNB; where a source to target transparent container cell of the handover request information contains the reduced capability NR UE information; and forward, by the source gNB, handover request confirmation information to the UE after a resource admission qualification of the target gNB of the UE is determined and an allocation of a resource required based on reduced capability NR UEs in the target gNB is completed.

Based on the embodiments of the present application described above, the gNB receiving module is further configured to: send, by the UE, the handover required information to the AMF through the source gNB, acquire the handover request information forwarded by the AMF, where a source to target transparent container cell of the handover required information and the handover request information contains reduced capability NR UE information; and forward the handover request confirmation information to the target gNB through the AMF after a resource admission qualification of the target gNB of the UE is determined and an allocation of a resource required based on reduced capability NR UEs in the target gNB is completed.

In an implementation, a number of AMFs in the gNB receiving module includes at least one.

Figure 19:
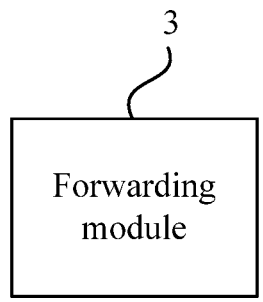
FIG. 19 is a schematic structural diagram of another information processing apparatus provided in an embodiment of the present application.

FIG. 19 is a schematic structural diagram of an information processing apparatus provided in an embodiment of the present application. The information processing apparatus may execute the information processing method provided in any of the embodiments of the present application, and has functional modules and advantageous effects corresponding to the executed method. The apparatus may be implemented by software and/or hardware and may generally be integrated into an AMF. The apparatus specifically includes a forwarding module 3. The forwarding module 3 is configured to send radio capability information of a UE to a gNB; where the radio capability information includes UE capability information.

According to the technical scheme provided in the embodiments of the present application, the radio capability information containing reduced capability NR UE information is sent to the gNB through the forwarding module 3, so that the capability supported by the UE is acquired by the gNB, related resources are distributed for the UE, a corresponding function of the UE is realized, the usability of a UE service is guaranteed, and the user experience degree is improved.

Based on the embodiments of the present application described above, a characteristic of the UE in the forwarding module 3 includes at least one of: a reduction of a number of UE RX/TX antennas, a reduction of a UE bandwidth, a half-duplex FDD, a relaxed UE processing time, or a relaxed UE processing capability.

Based on the embodiments of the present application described above, the reduced capability NR UE information in the forwarding module 3 includes at least one of: reduced capability NR UE category information, reduced capability NR UE support indication information, reduced capability NR UE receiving capability information, reduced capability NR UE uploading capability information, UE transmission capability information, UE radio frequency capability information, or UE measurement capability information.

Based on the embodiments of the present application described above, the forwarding module 3 includes an information receiving unit, a request sending unit and a configuration unit. The information receiving unit is configured to receive initial UE information sent by the gNB after the gNB establishes a communication connection with the UE, where the initial UE information at least includes one of service request information, attachment request information, or TAU request information.

The request sending unit is configured to send an initial context establishment request to the gNB, where a UE radio capability cell of the initial context establishment request includes the reduced capability NR UE information.

The configuration unit is configured to cause the gNB to determine the RRC reconfiguration information according to the reduced capability NR UE information, where the RRC reconfiguration information includes at least one of: reduced capability NR UE measurement configuration information, reduced capability NR UE radio resource configuration information, or reduced capability NR UE mobility control information.

Based on the embodiments of the present application described above, the forwarding module 3 includes an initial unit, an establishment request unit and an information acquisition unit. The initial unit is configured to receive initial UE information sent by the gNB after the gNB establishes a communication connection with the UE, where the initial UE information at least includes one of service request information, attachment request information, or TAU request information.

The establishment request unit is configured to send an initial context establishment request to the gNB, where a UE radio capability cell of the initial context establishment request includes the reduced capability NR UE information.

The information acquisition unit is configured to acquire a UE capability information indication sent by the gNB, where the UE capability information indication is determined by the gNB through enquiring UE capability enquiry information of the UE, and a UE capability cell in the UE capability information indication includes the reduced capability NR information.

Based on the embodiments of the present application described above, the forwarding module 3 includes a gNB forwarding unit. The gNB forwarding unit is configured to acquire the radio capability information forwarded by the source gNB, and forward the radio capability information to the target gNB.

Based on the embodiments of the present application described above, the gNB forwarding unit is specifically configured to acquire handover request information sent by the source gNB, where a source to target transparent container cell of the handover request information contains the reduced capability NR UE information; and forward the handover request information to the target gNB; and forward handover request confirmation information sent by the target gNB to the source gNB after a resource admission qualification of the target gNB is obtained by the UE and an allocation of a resource required based on reduced capability NR UEs in the target gNB is completed.

Based on the embodiments of the present application described above, the gNB forwarding unit is further specifically configured to: acquire handover request information forwarded by the source AMF through the source gNB, and forward the handover request information to the target gNB, where a source to target transparent container cell of the handover request information and the handover required information contains the reduced capability NR UE information; and forward handover request confirmation information sent by the target gNB to the source gNB through the source AMF by using a handover command after a resource admission qualification of the target gNB is obtained by the UE and an allocation of a resource required based on reduced capability NR UEs in the target gNB is completed.

Figure 20:
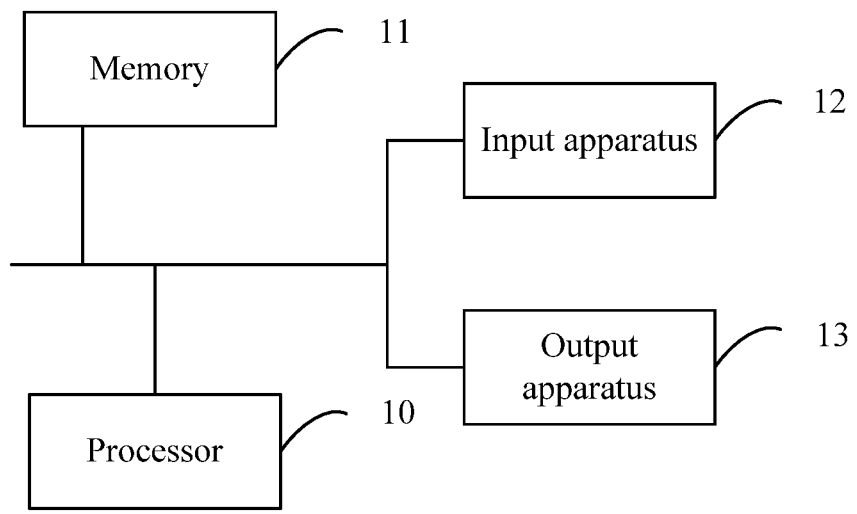
FIG. 20 is a schematic structural diagram of a device provided in an embodiment of the present application.

FIG. 20 is a schematic structural diagram of a device provided in an embodiment of the present application, as shown in FIG. 20, the device includes a processor 10, a memory 11, an input apparatus 12, and an output apparatus 13; a number of processors 10 in the device may be one or more, one processor 10 is used as an example in FIG. 20; the device processor 10, the memory 11, the input apparatus 12, and the output apparatus 13 may be connected via a bus or in other manners, they being connected via the bus is used as an example in FIG. 20.

As a computer-readable storage medium, the memory 11 may be configured to store a software program, a computer executable program, and a module, such as a module corresponding to the information processing apparatus in the embodiments of the present application (the sending module 1, the receiving module 2, or the forwarding module 3). The processor 10 executes various functional applications of the device and a data processing by executing software programs, instructions, and modules stored in the memory 11, so that the above-described information processing method is implemented.

The memory 11 may mainly include a storage program region and a storage data region, where the storage program region may store an operating system, an application program required for at least one function; the storage data region may store data or the like created according to the use of the terminal. Moreover, the memory 11 may include a high-speed random access memory and may also include a non-volatile memory, such as at least one magnetic disk storage device, a flash memory device, or other non-volatile solid-state memory device. In some instances, the memory 11 may further include a memory disposed remotely with respect to the processor 10, the remote memory may be connected to the device over a network. Instances of such networks include, but are not limited to, the Internet, an intranet, a local area network, a mobile communication network, and combinations thereof.

The input apparatus 12 may be configured to receive input numeric or character information and to generate key signal inputs related to user settings and functional controls of the device. The output apparatus 13 may include a display device such as a display screen.

An embodiment of the present application further provides a storage medium containing a computer executable instruction, where the computer executable instruction is configured to perform, when executed by a computer processor, the information processing method. The method includes that: radio capability information is sent to a gNB; where the radio capability information includes reduced capability NR UE information; or radio capability information sent a UE is received; where the radio capability information includes UE capability information; or radio capability information of a UE is sent to a gNB; where the radio capability information includes UE capability information.

According to the storage medium containing the computer executable instruction provided in the embodiments of the present application, the computer executable instruction is not limited to the method operations described above, and may also perform related operations in the information processing method provided in any of the embodiments of the present disclosure.

The above description is only an exemplary embodiment of the present application, and is not intended to limit the scope of protection of the present application.

It should be understood by those skilled in the art that the term "user terminal" covers any suitable type of wireless user equipment, such as a mobile phone, a portable data processing apparatus, a portable web browser or a vehicle-mounted mobile station.

In general, various embodiments of the present application may be implemented in hardware or special purpose circuit, software, logic or any combination thereof. For example, some aspects may be implemented in hardware, while other aspects may be implemented in firmware or software which may be executed by a controller, microprocessor or other computing device, although the present application is not limited thereto.

Embodiments of the present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), etc. Computer readable media may include non-instantaneous storage media. Data processors may be of any type suitable for the local technical environment, such as, but not limited to, general-purpose computers, specialized computers, microprocessors, digital signal processors (DSP), application specific integrated circuits (ASIC), field-programmable gate array (FPGA)), and processors based on multi-core processor architectures.

What is claimed is:

1. An information processing method, implemented by a user equipment (UE), comprising:
   receiving, from a next generation NodeB (gNB), system information block (SIB) information comprising physical random access channel (PRACH) resource configuration information, the SIB information configured to distinguish PRACH resources configured for the UE having a reduced capability from PRACH resources configured for a UE having a non-reduced capability; and
   sending, to the gNB, a reduced capability UE information corresponding to the reduced capability of the UE as compared to the UE having a non-reduced capability, the reduced capability UE information determined based on the SIB information, and
   wherein the PRACH resource configuration information includes uplink BWP configuration information configured to send the reduced capability UE information using the uplink BWP configuration information, and
   wherein the sending of the reduced capability UE information comprises:
   sending a random access message 3 indicating the reduced capability UE information by using a reserved value of a logical channel identifier (LCID) in a MAC sub-header,
   wherein the reserved value has a first value or a second value based on whether the random access message 3 is transmitted on a common control channel (CCCH) having a first size or a second size, the first value and the second value being different from values of the LCID in the MAC sub-header configured for the UE having the non-reduced capability.

2. The information processing method of claim 1, wherein the first value is 35 in case that the random access message 3 is transmitted on a common control channel (CCCH) having a size of 48 bits and the second value is 36 in case that the random access message 3 is transmitted on a CCCH having a size of 64 bits.

3. An information processing method, implemented by a next generation NodeB (gNB), comprising:
   sending, to a user equipment (UE), system information block (SIB) information comprising physical random access channel (PRACH) resource configuration information, the SIB information configured to distinguish PRACH resources configured for the UE having a reduced capability from PRACH resources configured for a UE having a non-reduced capability;
   receiving, from the UE, a reduced capability UE information corresponding to the reduced capability of the UE as compared to the UE having the non-reduced capability, the reduced capability UE information determined based on the SIB information, and
   wherein the PRACH resource configuration information corresponds to uplink BWP configuration information configured to send the reduced capability UE information using the uplink BWP configuration information, and
   wherein the receiving of the reduced capability UE information comprises:
   receiving a random access message 3 indicating the reduced capability UE information by using a reserved value of a logical channel identifier (LCID) in a MAC sub-header,
   wherein the reserved value has a first value or a second value based on whether the random access message 3 is transmitted on a common control channel (CCCH) having a first size or a second size, the first value and the second value being different from values of the LCID in the MAC sub-header configured for the UE having the non-reduced capability.

4. The information processing method of claim 3, wherein the first value is 35 in case that the random access message 3 is transmitted on a common control channel (CCCH) having a size of 48 bits and the second value is 36 in case that the random access message 3 is transmitted on a CCCH having a size of 64 bits.

5. An information processing apparatus configured to operate as a user equipment (UE) and perform an information processing method comprising:
   receiving, from a next generation NodeB (gNB), system information block (SIB) information comprising physical random access channel (PRACH) resource configuration information, the SIB information configured to distinguish PRACH resources configured for the UE having a reduced capability from PRACH resources configured for a UE having a non-reduced capability;
   sending, to the gNB, a reduced capability UE information corresponding to the reduced capability of the UE as compared to the UE having the non-reduced capability, the reduced capability UE information determined based on the SIB information, and
   wherein the PRACH resource configuration information includes uplink BWP configuration information configured to send the reduced capability UE information using the uplink BWP configuration information, and
   wherein the sending of the reduced capability UE information comprises:

sending a random access message 3 indicating the reduced capability UE information by using a reserved value of a logical channel identifier (LCID) in a MAC sub-header, wherein the reserved value has a first value or a second value based on whether the random access message 3 is transmitted on a common control channel (CCCH) having a first size or a second size, the first value and the second value being different from values of the LCID in the MAC sub-header configured for the UE having the non-reduced capability.

6. The information processing apparatus of claim 5, wherein the first value is 35 in case that the random access message 3 is transmitted on a common control channel (CCCH) having a size of 48 bits and the second value is 36 in case that the random access message 3 is transmitted on a CCCH having a size of 64 bits.

7. An information processing apparatus configured to perform an information processing method comprising:

sending, to a user equipment (UE), system information block (SIB) information comprising physical random access channel (PRACH) resource configuration information, the SIB information configured to distinguish PRACH resources configured for the UE having a reduced capability from PRACH resources configured for a UE having a non-reduced capability;

receiving, from the UE, a reduced capability UE information corresponding to the reduced capability of the UE as compared to the UE having the non-reduced capability, the reduced capability UE information determined based on the SIB information, and wherein the PRACH resource configuration information includes uplink BWP configuration information configured to send the reduced capability UE information using the uplink BWP configuration information, and wherein the receiving of the reduced capability UE information comprises:

receiving a random access message 3 indicating the reduced capability UE information by using a reserved value of a logical channel identifier (LCID) in a MAC sub-header, wherein the reserved value has a first value or a second value based on whether the random access message 3 is transmitted on a common control channel (CCCH) having a first size or a second size, the first value and the second value being different from values of the LCID in the MAC sub-header configured for the UE having the non-reduced capability.

8. The information processing apparatus of claim 7, wherein the first value is 35 in case that the random access message 3 is transmitted on a common control channel (CCCH) having a size of 48 bits and the second value is 36 in case that the random access message 3 is transmitted on a CCCH having a size of 64 bits.

* * * * *